United States Patent
Kashiwagi

Patent Number: 5,353,239
Date of Patent: Oct. 4, 1994

[54] METHOD OF PROCESSING IMAGE SIGNAL BY OPTICAL GAMMA CORRECTION CURVE AND APPARATUS FOR PERFORMING THE SAME

[75] Inventor: Kazuhiro Kashiwagi, Hino, Japan

[73] Assignee: Kowa Company Ltd., Aichi, Japan

[21] Appl. No.: 904,697

[22] Filed: Jun. 26, 1992

[30] Foreign Application Priority Data

Jul. 4, 1991 [JP] Japan .................... 3-189583

[51] Int. Cl.⁵ .............................. G01B 11/00
[52] U.S. Cl. .................. 364/551.01; 364/571.02; 364/525
[58] Field of Search ........... 364/525, 551.01, 571.02; 358/443, 81, 448; 382/17, 28

[56] References Cited

U.S. PATENT DOCUMENTS

| | | | |
|---|---|---|---|
| 4,864,392 | 9/1989 | Sato | 358/443 |
| 4,984,072 | 1/1991 | Sandrew | 358/81 |
| 5,101,440 | 3/1992 | Watanabe et al. | 358/81 |
| 5,155,589 | 10/1992 | Gere | 358/81 |

Primary Examiner—Jack B. Harvey
Assistant Examiner—Thomas Peeso
Attorney, Agent, or Firm—Stevens, Davis, Miller & Mosher

[57] ABSTRACT

A density curve is derived from a plurality of known output data values and a plurality of density values which are obtained by the known output data values. Then, a desired gamma correction curve is formed in accordance with the thus derived density curve. Finally the thus formed gamma correction curve is finely adjusted in accordance with a desired correction curve which is selected from a plurality of previously prepared correction curves. In order to simplify the data entering operation, a small number of data values are entered and then an interpolation is performed to obtained a necessary number of data values. The gamma correction curve is formed only when the apparatus is installed, the property of the developing solution is changed or the record film is changed. In this manner, the optimal gamma correction curve can be simply and directly formed.

17 Claims, 6 Drawing Sheets

FIG_3
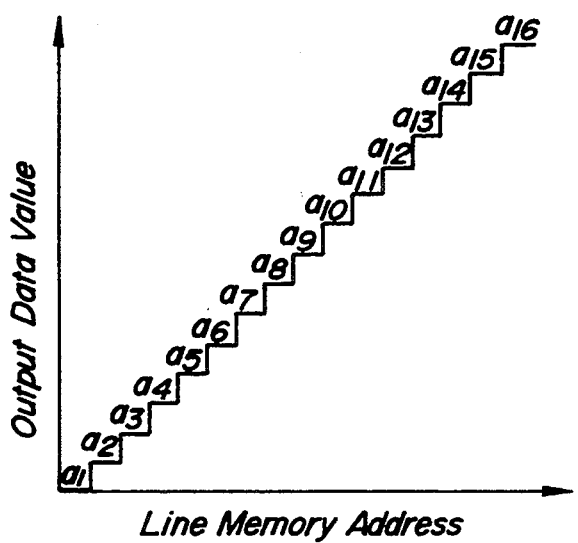
FIG_4
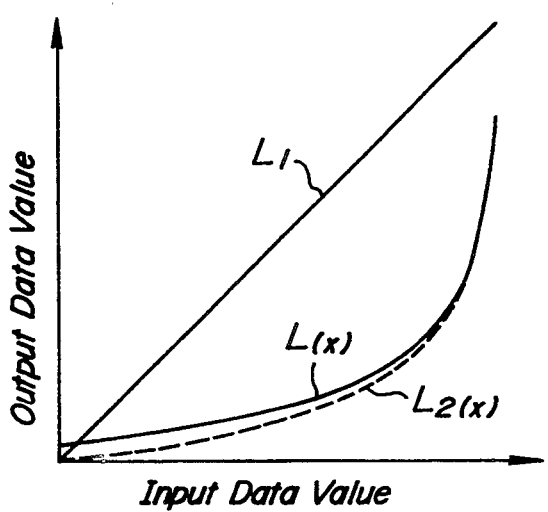

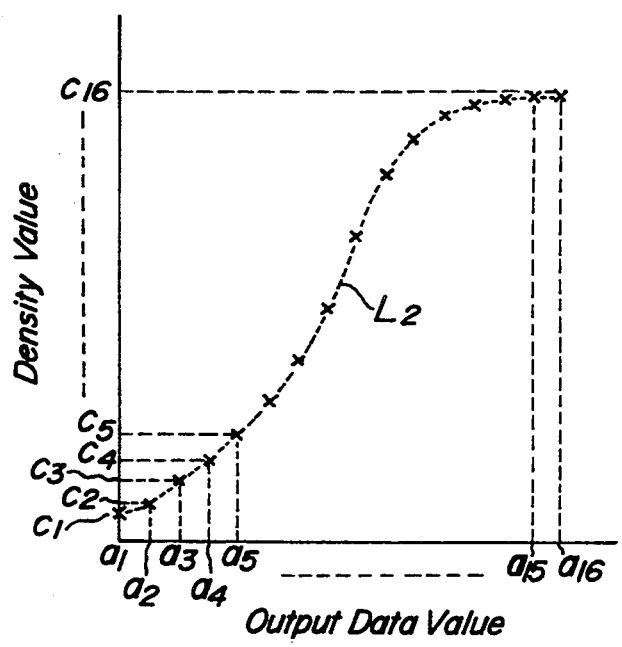
FIG_5
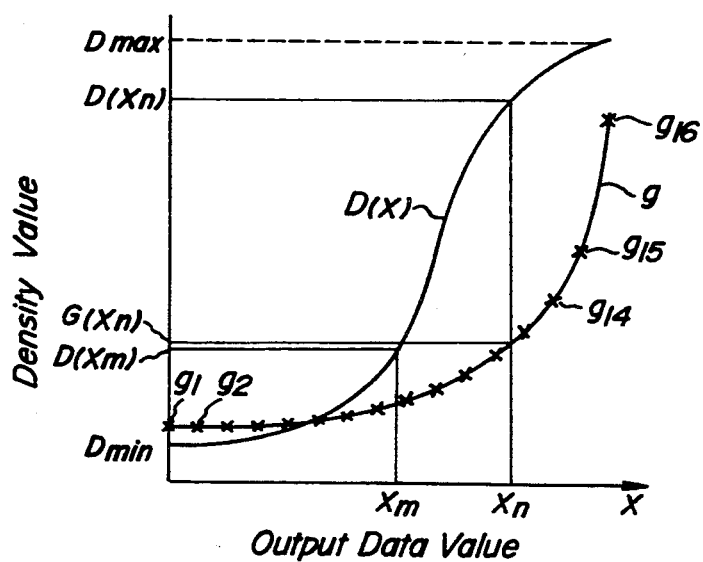
FIG_6

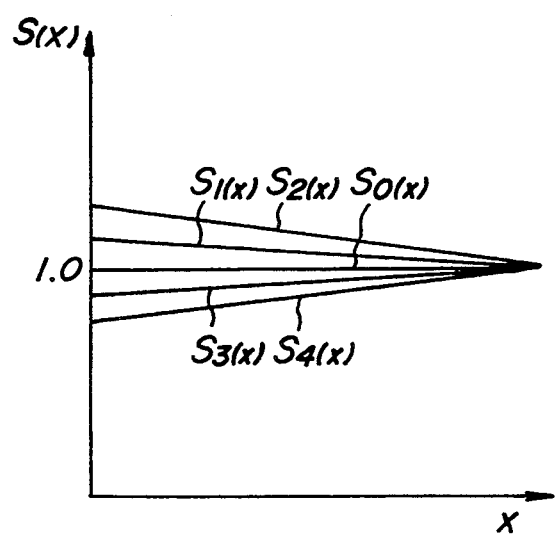
FIG_7

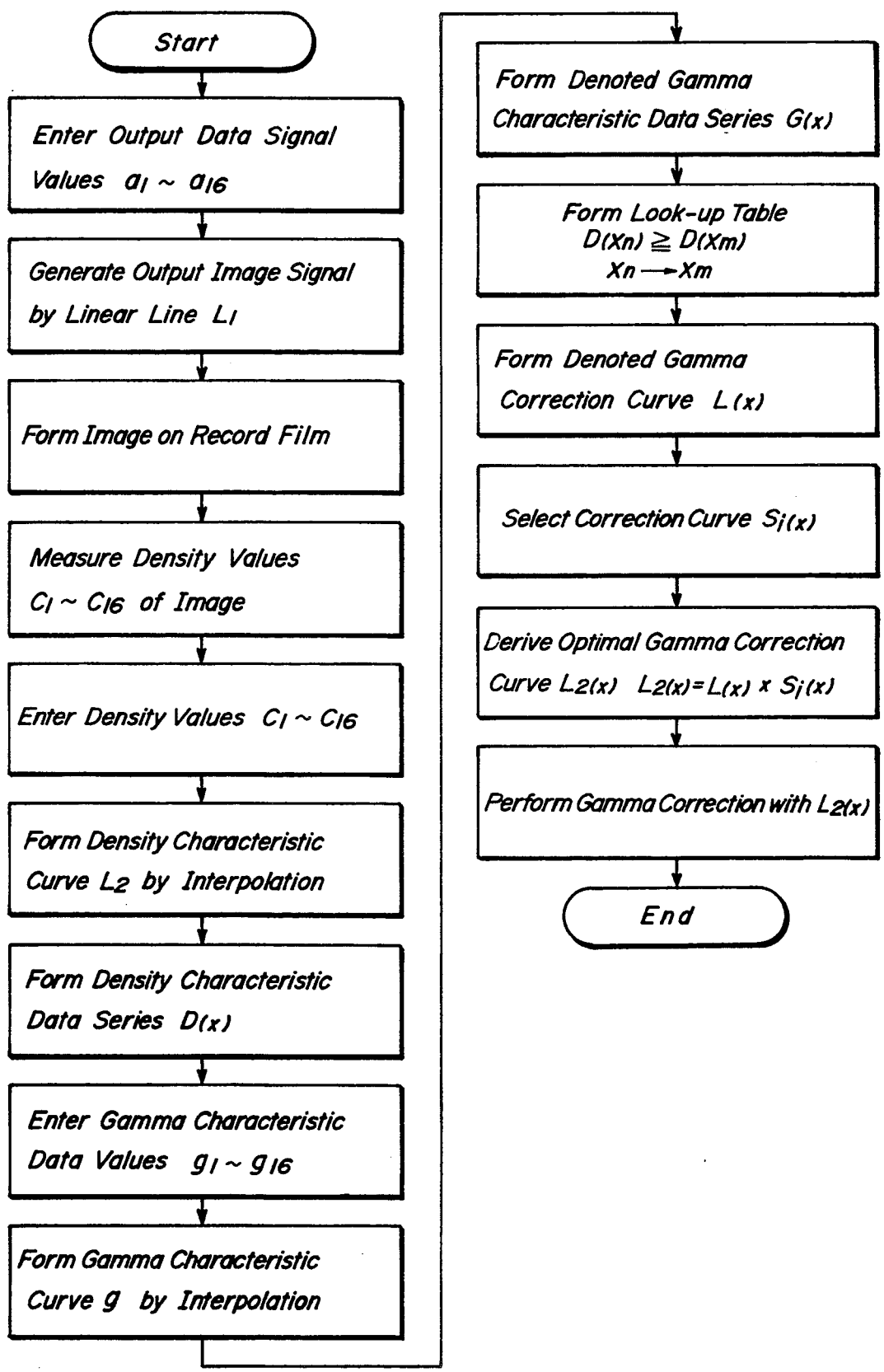
FIG_8

METHOD OF PROCESSING IMAGE SIGNAL BY OPTICAL GAMMA CORRECTION CURVE AND APPARATUS FOR PERFORMING THE SAME

BACKGROUND OF THE INVENTION

1. Field of the Invention

The present invention relates to an image signal processing method and apparatus for processing an input image signal generated by an image signal generating device such as an X-ray CT scanner and MRI and supplying an output image signal to an image forming device such as a laser printer and CRT multi format camera, and more particularly relates to an image signal processing method and apparatus for effecting a gamma correction for the input image signal such that a hard copy having an excellent halftone can be reproduced by the image forming device.

2. Related Art Statement

In order to visualize an image signal generated by an X-ray CT scanner and MRI, there have been practically used a CRT multi format camera and a laser printer for recording a visible image on an image record medium such as photographic film and plain paper. As is well known in the art, a brightness characteristic of a display monitor of the X-ray CT scanner is usually different from a gamma characteristic of an image recording device, so that if the image signal is recorded as it is, a desired halftone could not be obtained on a recorded image. Therefore, there is provided an image signal processing apparatus between the image signal generating device and the image forming device for effecting a gamma correction for the image signal to be recorded. Usually a gamma correction curve of the image forming device such as the multi format camera is set to be substantially identical with the brightness characteristic of the display monitor of the image signal generating device, so that the halftone of the displayed image is faithfully reproduced on the recorded image. However, in a relatively large hospital there are provided a plurality of display monitors of different types and these monitors have different brightness characteristics from each other. Further, even if a plurality of display monitors of the same type are used, the brightness characteristics of these display monitors are usually adjusted in various ways depending upon different requirements of respective doctors in the hospital.

In the above mentioned CRT multi format camera, a gamma characteristic is a combination of a gamma characteristic of a CRT serving as a light source and a gamma characteristic of a film to be used, and this composite gamma characteristic is usually different from that of the display monitor. Moreover, in the known image signal processing apparatus, since the analog image signal is treated, a desired gamma correction curve can be obtained only by a time consuming trial and error method while a plurality of parameters such as contrast, brightness and exposure time are adjusted in various ways. Therefore, it takes a very long time even for an experienced engineer, and sometimes the optimal gamma correction curve could not be attained and the halftone of the image displayed on the X-ray CT display monitor could not be faithfully reproduced on a recorded hard copy.

In the laser printer, the digital image signal is processed and a dynamic range of the output signal is larger than that of the input signal, so that the gamma correction curve can be set rather freely. In the known laser printer, there are provided a plurality of gamma correction curves and an operator selects the most suitable gamma correction curve therefrom. However, in order to select a desired gamma correction curve, it is still necessary to perform the selection in the trial and error method. Further, if the desired gamma correction curve is not prepared, the image signal could not be processed by the optimal gamma correction curve.

SUMMARY OF THE INVENTION

The present invention has for its object to provide a novel and useful image signal processing method and apparatus in which the above-mentioned drawbacks of the known image signal processing apparatuses could be removed, an optimal gamma correction curve can be directly and promptly set without effecting a selection of the gamma correction curve by a time consuming trial and error method, and the gamma correction curve can be adjusted finely.

According to the invention, a method of effecting a gamma correction for an input image signal generated by an image signal generating device and supplying an output image signal to an image forming device comprises the following steps:

entering a plurality of known output data signal values and a plurality of density values which are formed by the image forming device in response to said plurality of known output data signals;

forming a density curve data representing a relationship between said plurality of known output data signal values and said plurality of density values;

entering a plurality of denoted density values which define a denoted gamma correction curve;

forming a gamma correction curve from said plurality of denoted density values by utilizing said density curve; and adjusting said gamma correction curve finely in accordance with a correction curve selected from a plurality of previously prepared correction curves.

According to the invention, an image signal processing apparatus for effecting a gamma correction for an input image signal and supplying an output image signal to an image forming device comprises:

data input means for entering a plurality of known output data signal values, a plurality of density values which are formed by the image forming device in response to said plurality of known output data signals, and a plurality of denoted density values which define a denoted gamma correction curve;

density curve forming means for forming a density curve representing a relationship between said plurality of known output data signal values and said plurality of density values;

gamma correction curve forming means for forming a gamma correction curve from said plurality of denoted density values by utilizing said density curve; and adjusting means for finely adjusting said gamma correction curve in accordance with a correction curve selected from a plurality of previously prepared correction curves.

In a preferable embodiment of the image signal processing apparatus according to the invention, said density curve forming means is constructed such that a curve which connects smoothly said plurality of density values is derived as the density curve. Further, said density curve forming means is advantageously constructed such that an interpolation is performed for the entered plurality of known output data signal values and density values to derive a larger number of output data signal values and density values than that of the entered values, and said density curve is formed from said larger number of output data signal values and density values.

In such an image signal processing apparatus according to the invention, the density curve is derived by inputting a relatively small number of data signal values and a desired gamma correction curve can be formed simply and directly from the thus derived density curve. Further, the gamma correction curve is corrected or finely adjusted in accordance with a correction curve which is selected from a plurality of previously prepared correction curves. In this manner, an optimal gamma correction curve can be obtained accurately and simply.

BRIEF DESCRIPTION OF THE DRAWINGS

FIG. 3 is graph representing a relationship between the line memory address and the output data value;

FIG. 4 is a graph denoting a relationship between the input data value and the output data value of a look-up table;

FIG. 5 is a graph showing a relationship between the output data value and the density;

FIG. 6 is a graph representing a relationship between the output data value and the density value;

FIG. 7 is a graph showing a plurality of finely correcting curves; and

FIG. 8 is a flow chart showing the successive steps for performing the gamma correction according to the present invention.

DESCRIPTION OF THE PREFERRED EMBODIMENT

Figure 1:
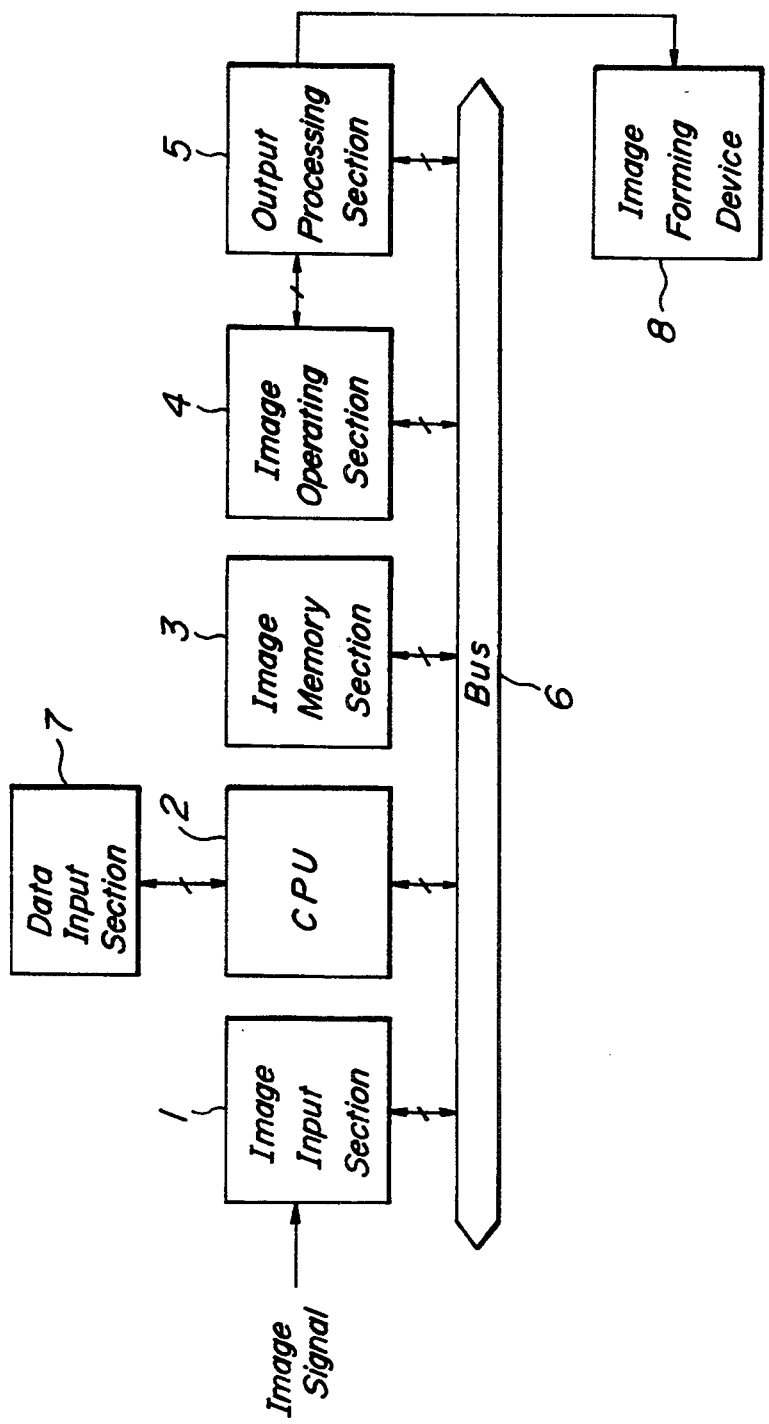
FIG. 1 a block diagram showing the whole construction of an embodiment of the image signal processing apparatus according to the invention.

FIG. 1 is a block diagram showing the construction of an embodiment of the image signal processing apparatus according to the invention. An image signal generated by a medical diagnostic image signal generating device such as an X-ray CT scanner is supplied to an image input section 1. If the input image signal supplied from the image signal generating device is in analog form, the analog image signal is converted by the image input section 1 into a digital image signal. To this end, the image input section 1 includes an A/D converter. The digital image signal supplied from the image input section 1 is transferred via a bus 6 into an image memory section 3 and is stored therein. After the input image signal of a single image has been stored in the image memory section 3, the image data is supplied from the image memory section 3 to an image operating section 4 via the bus 6. In the image operating section 4, an interpolation is carried out and an interpolated image signal is supplied to an output processing section 5. In the output processing section 5, a gamma correction is performed to produce an output digital image signal having a corrected gamma characteristic. Then, the thus obtained output digital image signal is converted into an analog output image signal. This analog output image signal is supplied to an image forming device 8 as a brightness signal. The image forming device 8 may be formed by any raster scanning type image recording device having a laser light source or CRT light source. In the present embodiment, the image forming device 8 is formed by a laser printer in which an intensity of a laser light beam is modulated in accordance with the output image signal to be recorded. The apparatus further comprises a CPU section 2 which performs various functions such as control of the operation of the whole apparatus, calculation of various data values for deriving density curve and gamma correction curve, and fine adjustment of the gamma correction curve. To the CPU section 2 is connected a data input section 7 for entering known output data signal values, measured density values corresponding to these known output data signal values and a selection command for a correction curve as will be explained later.

Figure 2:
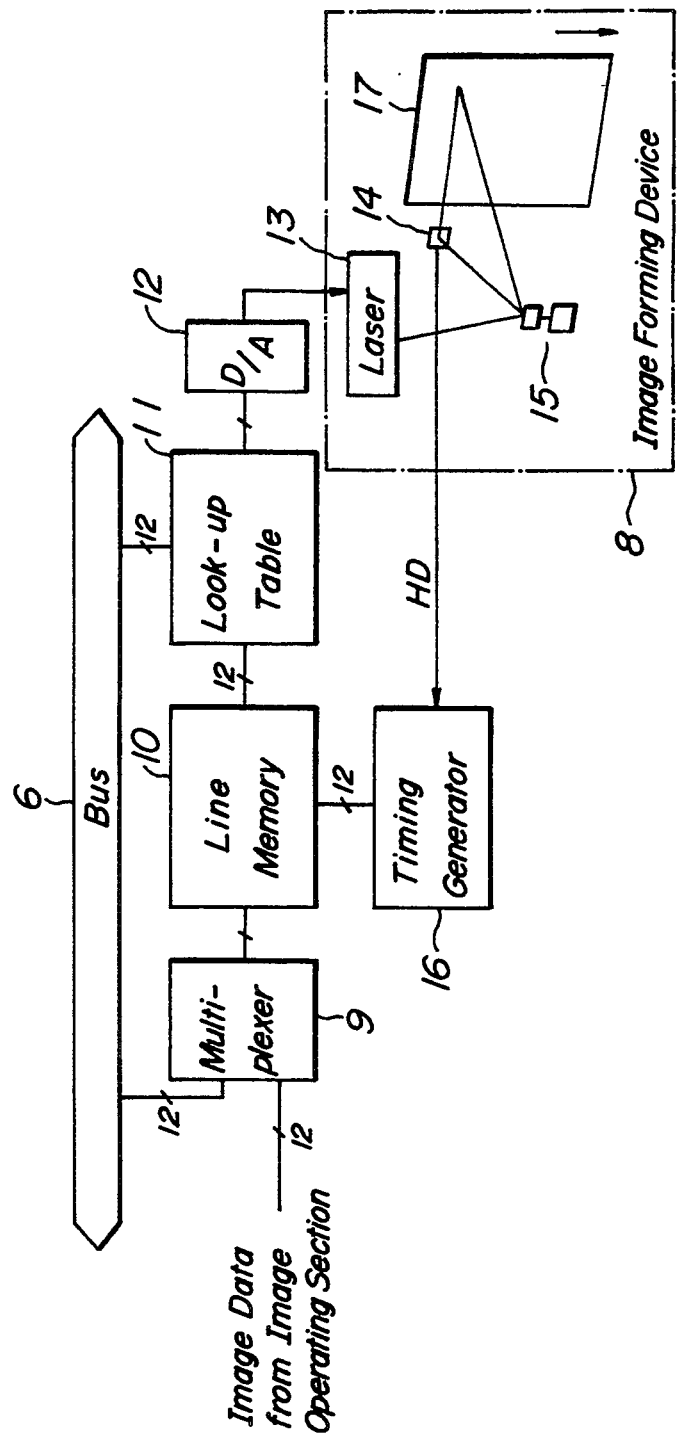
FIG. 2 is a block diagram illustrating the detailed construction of output processing section and image forming device shown in FIG. 1.

FIG. 2 is a block diagram illustrating the detailed construction of the output processing section 5 and image forming device 8. The image data signal produced by the image operating section 4 is transferred via a multiplexer 9 to a line memory 10, and then is subjected to the gamma correction with reference to a look-up table 11. Then, the gamma corrected digital output image signal is converted into a gamma corrected analog output image signal by a D/A converter 12. The line memory 10 and look-up table 12 are also connected to the bus 6 so that data can be transferred between these circuits and the CPU section 2. In the present embodiment, a digital input image data value representing one pixel is formed by twelve bits. That is to say, a respective pixel may be represented by $2^{12}$ halftones. The analog output image signal produced by the D/A converter 12 is supplied to a laser light source 13 in the image forming device 8 and the intensity of a laser beam emitted from the laser light source is modulated in accordance with the analog output image signal. The thus modulated laser beam is deflected in a horizontal direction by a deflection device 15 which is driven in synchronism with a line frequency and is made incident upon a record film 17. In the present embodiment, the deflection device 15 includes a reflection mirror and a motor for swinging the deflection mirror. The record film 17 is moved in a vertical direction shown by an arrow at a constant speed by a suitable driving means not shown. On one side of the record film 17 there is arranged a photoelectric converting element 14 to receive the laser beam which is overscanned out of the record film. Therefore, an output signal from the photoelectric converting element 14 is synchronized with the horizontal driving signal HD. This signal is supplied to a timing generator 16 to generate a timing signal synchronized with the horizontal driving signal HD and the line memory 10 is read out by the thus generated timing signal.

Now the operation for performing the gamma correction will be explained. According to the present invention, the gamma correcting operation may be classified into the following three steps:

(1) deriving a density characteristic of a whole system including the image forming device and record film, said density characteristic representing a relationship between output image data signal values and corresponding density values obtained by the image forming device, i.e. the blackening of the record film 17;

(2) forming a gamma correction curve by entering density values representing a desired or denoted gamma characteristic;

(3) finely adjusting the gamma correction curve.

At first, the operation for obtaining the density characteristic of the whole system including the image forming device 8 and record film 17 will be explained. When a silver salt film is used as the record film 17, it is necessary to effect a development in order to obtain a final visible image. The developing process is very critical and if a temperature of a developing solution varies only slightly, the density i.e. blackening of the film image changes largely. Further, even if the same output data and the same gamma correction curve are used, the same density characteristic could not always be attained when the developing device is changed. Moreover when currently used record films are changed, new record films might have a density characteristic different from that of the old ones. Therefore, the density characteristic or blackening characteristic has to be known in the whole system including the image forming device, record film, developing device, developing solution, and so on.

As shown in FIG. 2, when the number of bits of a unit data value processed by the line memory 10, look-up table 11 and D/A converter 12 of the output processing section 5 is set to twelve bits, it would be necessary to measure density values of the film blackening the number of which amounts to $2^{12}=4096$ in order to obtain a completely accurate density characteristic of the whole system. However the number of data is too numerous for the practical use, so that in the present embodiment, the film density characteristic is derived from the limited number of output data signal values and density values corresponding thereto the number of which is extremely smaller than the whole number of output data signal values.

Among 4096 output data signal values several values are selected such that successive values are distributed substantially uniformly or equidistantly over the gray scale, and the density values corresponding to these output data signal values are measured and entered by means of the data input section 7. The density data thus entered shows discrete values. Then, the interpolation is performed for the entered output data signal values and density values to derive 4096 output data signal values and density values corresponding thereto. It has been experimentally confirmed that 10 to 40 output data signal values and density values are sufficient for obtaining the density characteristic of the system by means of which a practically accurate gamma correction can be performed. In the present embodiment, sixteen output image data signal values and sixteen density values corresponding thereto are used to reproduce the density characteristic of the whole system including the image recording device 8 and record film 17. The number of necessary output data signal values and density values may be determined by considering necessary resolution, the number of bits representing one pixel, a necessary time for measuring the density values.

As depicted in FIG. 3, the 4096 output data signal values are divided by 15 to form sixteen output data signal values $a_1$ to $a_{16}$. It should be noted that each of the sixteen output data signal values is represented by twelve bits. These output data signal values are stored in the line memory section 10. In the look-up table 11, there is written a linear characteristic line $L_1$ shown in FIG. 4 which represents a linear relationship between input data values and output data values of the look-up table 11. The entered output data signal values $a_1$ to $a_{16}$ are processed by such a linear characteristic line $L_1$ to derive an output image signal, and then the output image signal is supplied to the image forming device 8 to expose the film 17. After the exposed film 17 has been developed, the blackening of sixteen image areas having different blackenings are measured to derive sixteen density values $c_1$ to $c_{16}$ as shown in FIG. 5. A curve $L_2$ illustrated in FIG. 5 is a density curve representing the relationship between the output data values $a_1$ to $a_{16}$ and the density values $c_1$ to $c_{16}$.

Next a manner of deriving the density curve $L_2$ shown in FIG. 5 from the measured density values $c_1$ to $c_{16}$ by the interpolation will be explained. This can be performed by producing a smooth curve which passes through sixteen density value points. In such a case, a spline function is generally used. A third order spline curve P(t) can be given by the following equation (1), wherein t is a parameter.

$$P(t)=B_1+B_2t+B_3t^2+B_4t^3 \qquad (1)$$

In order to derive a smooth curve which passes n points from the spline equation (1), n position vectors $P_i(1 \leq 1 \leq n)$ and tangential vectors $P'_1$ and $P'_n$ at both ends of the curve are denoted, and then $B_1$ to $B_4$ are calculated for respective sections.

The density curve $L_2$ shown in FIG. 5 may be derived by placing the sixteen density values $c_1$ to $c_{16}$ as the position vectors $P_i$ and the tangential vectors $P'_1$ and $P'_n$ at both ends of the curve are set to zero. Then, 4096 density values for all the 4096 output data signal values are calculated from the density curve $L_2$. Here, a density characteristic data series of 4096 density values is represented by D(x).

In practice, the sixteen density values $c_1$ to $c_{16}$ are entered from the data input section 7 into the CPU section 2 and the above calculation is performed in accordance with a suitable program stored in the CPU section 2 to derive the density characteristic data series D(x). Since this calculation can be carried out within a very short time it is not necessary to store the thus calculated 4096 density values, and only the sixteen measured density values are stored in a nonvolatile memory. The density characteristic data series D(x) is calculated each time the gamma correction is performed.

In the manner explained above, the 4096 density values of the data series D(x) are obtained by using the interpolation. Then, it is possible to know the output data signal values which produce these density values. In this manner there is formed a data base which represents the relationship between the film density and the output data signal value of the whole system including the image processing apparatus, developing solution and record film.

Next, the above mentioned second process (2) will be explained in detail.

Similar to the process (1) it is practically undesired to enter all 4096 gamma characteristic data values each corresponding to one of 4096 halftones. Therefore, in the present embodiment sixteen typical gamma characteristic data values are entered from the data input section 7 and a gamma correction curve is obtained by effecting the interpolation using the spline function. It should be noted that as long as a smooth curve can be derived any interpolating function other than the spline function may be used. If there is a standard gamma characteristic (such as a case in which the same kind of film has been used), the gamma characteristic data values for such a standard gamma characteristic can be utilized. Further, the brightness characteristic of the display monitor of the X-ray CT scanner is measured and gamma characteristic data values may be calculated from the measured brightness values. Then, the thus calculated density values may be used as the gamma characteristic data values.

Now a manner of setting a gamma characteristic curve g shown in FIG. 6 will be explained. In this case, sixteen density values $g_1$ to $g_{16}$ of the gamma characteristic data are entered as typical values for the gamma correction curve. In this case, these density values must satisfy the following conditions.

$$D_{max} \geqq g_1 \text{ to } g_{16} \geqq D_{min} \quad (2)$$

wherein $D_{max}$ and $D_{min}$ are minimum and maximum values of the density characteristic data series $D(x)$. The CPU section 2 calculates the gamma characteristic curve g from the thus entered sixteen density values $g_1$ to $g_{16}$ in accordance with the spline equation. Then, 4096 density values for 4096 output data values are calculated from the thus derived gamma characteristic curve g. A data value series including these 4096 density values is denoted by $G(x)$. This gamma characteristic data series $G(x)$ is called a denoted gamma characteristic data series, because this data series represents the desired or denoted gamma correction curve.

Next a denoted gamma correction data series $L(x)$ of the look-up table for obtaining the denoted gamma characteristic data series $G(x)$ is derived. As shown in FIG. 6, at first the maximum value $x_m$ which satisfies the following equation (3) is derived for each value of 4096 denoted gamma characteristic data series $G(x)$ by using the density characteristic data series $D(x)$.

$$D(x_m) \geqq G(x_n) \quad (3)$$

Then, the thus derived maximum value $x_m$ is stored as the density values $x_n$ of the look-up table as represented by the following equation (4).

$$L(x_n) = x_m \quad (4)$$

When it is desired to obtain the film density $G(x_n)$ for the output data value $x_n$, if the line $L_1$ is set in the look-up table 11, the density value $D(x_n)$ is obtained for the output data value $x_n$, and this density value $D(x_n)$ is far from the density value $G(x_n)$. In order to change the density value $D(x_n)$ into the density value $G(x_n)$, it is necessary to change the output data values in the look-up table such that the density value $G(x_n)$ is obtained for the input data values $x_n$. When the density value $D(x_m)$ which is nearest to the density value $G(x_n)$ and satisfies the equation (4) is selected, the density value $G(x_n) \approx D(x_m)$ is obtained by deriving the output data value $x_m$. Therefore, the look-up table 11 is formed to produce the output data value $x_m$ in response to the input data value $x_n$. That is to say, $L(x_n) = x_m$ has to be satisfied. In this manner, the data values corresponding to $x_m$ are selected from the data base of the density characteristic data series $D(x_n)$ and the thus selected data values are set in the look-up table 11.

In this manner the denoted gamma correction data series $L(x)$ of the look-up table 11 can be obtained as shown in FIG. 4. This look-up table 11 defines the denoted gamma characteristic curve g. Similar to the case (1), the data values $G(x)$ and $L(x)$ are obtained only during the gamma correction and the sixteen density values $g_1$ to $g_{16}$ are stored in the non-volatile memory.

Next the process (3) for finely adjusting the gamma correction curve will be explained. The desired or denoted gamma correction curve $L(x)$ is formed by the above mentioned processes (1) and (2). In the actual diagnosis by using the X-ray CT scanner, different portions of patients have to be investigated, so that the gamma correction curve must be adjusted finely or slightly in order to obtain hard copies having an excellent halftone property. Further, the gamma correction curve has to be adjusted finely in dependence upon respective doctors.

In order to effect the fine adjustment of the gamma correction curve, there are prepared a plurality of correction curves $S_0(x)$ to $S_4(x)$ as shown in FIG. 7. These correction curves can be easily produced by entering sixteen data values similar to the cases of (1) and (2), so that a plurality of sets of sixteen data values for respective correction curves are prepared and stored in the ROM in the CPU section 2. For instance, when a correction curve $S_i(x)$ is selected, multiple operation is carried out for respective elements of the data series $L(x)$ in accordance with the following equation to obtain an optimal gamma correction curve $L_2(x)$.

$$L_2(x) = L(x) \times S_i(x) \quad (5)$$

In this case, $L_2(x)$ may exceed 4095 which is the maximum value represented by twelve bits, so that the maximum value of $L_2(x)$ is limited to the maximum value of twelve bit number. The optimal gamma correction curve $L_2(x)$ which has been finely adjusted in the manner explained above is also shown in FIG. 4.

As explained above, the gamma correction has been explained by dividing the three steps (1), (2) and (3). In practice, the entrance of the sixteen output data signal values $a_1$ to $a_{16}$ is performed at a time when the apparatus is initially installed, but the property of the developing solution is changed after it has been used for a predetermined time or when the kind of record film is changed. Further, the entrance of the density data values $c_1$ to $c_{16}$ for setting the desired gamma characteristic is performed at a time when the apparatus is installed or it is required to change the desired property. Then, only the fine adjustment of the gamma curve is carried out as a routine work, and during this adjustment the above mentioned calculations are performed and the data for effecting the optimal gamma correction is written in the look-up table.

FIG. 8 is a flow chart showing the above explained operation of the image signal processing method according to the invention. At first, the output data signal values $a_1$ to $a_{16}$ are entered from the data input section 7. Then, these output data signal values $a_1$ to $a_{16}$ are converted into the output image signal by using linear characteristic line $L_1$ shown in FIG. 4, and the thus obtained output image signal is supplied to the image forming device 8 to form the image on the record film 17. Then, the density values $c_1$ to $c_{16}$ of the recorded image corresponding to the output data signal values $a_1$ to $a_{16}$ are measured and are entered from the data input section 7.

Next the density characteristic curve $L_2$ shown in FIG. 5 is formed by the interpolation. Then, the density characteristic data series $D(x)$ illustrated in FIG. 6 is formed from the density characteristic curve $L_2$. Now the density values $g_1$ to $g_{16}$ representing the desired gamma correction curve are entered from the data input section 7, and the gamma characteristic curve g shown in FIG. 6 is formed by the interpolation. Then, the denoted gamma characteristic data series $G(x)$ is formed from the gamma characteristic curve g.

Next, the denoted gamma correction data series $L(x)$ of the look-up table 11 is formed from the denoted gamma characteristic data series $G(x)$ and the density characteristic data series $D(x)$ under the condition defined by the equations (3) and (4). In this manner there is formed the denoted gamma correction curve $L(x)$ shown in FIG. 4. Next, one correction curve $S_i(x)$ is selected from a plurality of the correction curves $S_0(x)$ to $S_4(x)$, and then the optimal gamma correction curve $L_2(x)$ is derived from $L_2(x)=L(x)\times S_i(x)$. Finally the gamma correction is performed by using the thus derived optimal gamma correction curve $L_2(x)$.

As explained above in detail, according to the present invention, there is formed the data base representing the relationship between the output data signal values and the film density values of the whole system including the image processing apparatus, record film and developing solution, and the desired gamma correction curve can be directly and simply obtained by entering a small number of data values on the basis of the data base. Therefore, the denoted gamma correction curve can be set within a very short time without using the trial and error method. Further the gamma correction curve can be adjusted finely, so that a number of input image data having slightly different gamma characteristics can be treated.

Moreover, the optimal gamma correction curve having any desired shape can be formed from a smaller number of data values, so that a non-volatile memory having a large capacity is not required for storing and reconstructing the one formed gamma correction curve.

What is claimed is:

1. A method of effecting a gamma correction for an input image signal generated by an image signal generating device and supplying an output image signal to an image output device, said method comprising the following steps:
   (a) employing the image output device to form a plurality of density values in response to a plurality of known output data signal values;
   (b) forming a density characteristic curve representing a relationship between said plurality of known output data signal values and said plurality of density values;
   (c) forming a denoted gamma correction curve from a plurality of denoted gamma characteristic data values which define a denoted gamma correction curve by utilizing said density characteristic curve; and
   (d) adjusting said denoted gamma correction curve finely in accordance with a fine correction curve selected from a plurality of previously prepared fine correction curves.

2. A method according to claim 1, wherein the number of said plurality of known output data signal values and said plurality of density values corresponding thereto is set to be smaller than the number of all possible output data signal values and all possible density values corresponding to all possible halftones represented by the input image signal.

3. A method according to claim 2, wherein all possible density values are derived by effecting an interpolation for said plurality of density values.

4. A method according to claim 3, wherein said denoted gamma correction curve is formed from said denoted gamma characteristic data values whose number is smaller than that of all possible data values of the denoted gamma correction curve.

5. A method according to claim 4, wherein all possible data values of the denoted gamma correction curve are derived by performing an interpolation for the denoted gamma characteristic data values.

6. A method according to claim 5, wherein said denoted gamma correction curve is formed by constructing a look-up table representing a relationship between all the possible input image signal values and corresponding output data signal values each of which is selected from the density values in the density characteristic curve such that said density value is a maximum value but does not exceed a density value in the denoted gamma correction curve corresponding to said output data signal value.

7. A method according to claim 1, wherein step (e) comprises selecting said fine correction curve from said plurality of previously prepared fine correction curves in accordance with a type of image represented by said input image signal.

8. A method according to claim 1, wherein step (e) comprises selecting said fine correction curve from said plurality of previously prepared fine correction curves in accordance with a user of an image represented by said input image signal.

9. A method according to claim 1, wherein step (e) comprises selecting said fine correction curve from said plurality of previously prepared fine correction curves in accordance with a condition of said image output device.

10. A method according to claim 1, wherein said image output device comprises a cathode ray tube, and wherein step (a) comprises displaying said plurality of density values on said cathode ray tube and measuring said plurality of density values as displayed on said cathode ray tube.

11. A method according to claim 1, wherein said image output device comprises a printer, and wherein step (a) comprises printing said plurality of density values with said printer and measuring said plurality of density values as printed with said printer.

12. A method of effecting a gamma correction for an input image signal generated by an image signal generating device and supplying an output image signal to an image output device, said method comprising the following steps:
   (a) generating an output image signal by processing a plurality of known output data signal values in accordance with a linear characteristic curve;
   (b) forming an image on a record medium in accordance with the output image signal;
   (c) measuring a plurality of density values in said image;
   (d) interpolating said plurality of density values to derive all possible density values;
   (e) forming a density characteristic curve from the all possible density values;
   (f) deriving all possible output data signal values from the density characteristic curve;
   (g) forming a density characteristic data series representing a relationship between said all possible output data signal values and said all possible density values;

(h) interpolating a plurality of denoted gamma characteristic data values to derive all possible denoted gamma characteristic data values;

(i) forming a look-up table from said all possible denoted gamma characteristic data values and said density characteristic data series;

(j) forming a denoted gamma correction curve from said look-up table;

(k) selecting one of a previously prepared plurality of fine correction curves; and (l) forming an optimal gamma correction curve as a product between said denoted gamma correction curve and said one of said previously prepared plurality of fine correction curves selected in step (k).

13. A method according to claim 12, wherein step (k) comprises selecting said one of said plurality of previously prepared fine correction curves in accordance with a type of image represented by said input image signal.

14. A method according to claim 12, wherein step (k) comprises selecting said one of said plurality of previously prepared fine correction curves in accordance with a user of an image represented by said input image signal.

15. A method according to claim 12, wherein step (k) comprises selecting said one of said plurality of previously prepared fine correction curves in accordance with a condition of said image output device.

16. An image signal processing apparatus for effecting a gamma correction for an input image signal and supplying an output image signal to an image output device, said apparatus comprising:

data input means for entering (a) a plurality of known output data signal values, (b) a plurality of density values formed by the image output device in response to said plurality of known output data signals, and (c) a plurality of denoted density values;

density curve forming means for forming a density curve representing a relationship between said plurality of known output data signal values and said plurality of density values;

gamma correction curve forming means for forming a denoted gamma correction curve from said plurality of denoted density values by utilizing said density curve; and adjusting means for finely adjusting said denoted gamma correction curve in accordance with a fine correction curve selected from a plurality of previously prepared fine correction curves.

17. An apparatus according to claim 16, wherein said adjusting means comprises means for selecting said fine correction curve from said plurality of previously prepared fine correction curves.

* * * * *